United States Patent
Propheter-Hinckley

(10) Patent No.: US 10,458,262 B2
(45) Date of Patent: Oct. 29, 2019

(54) AIRFOIL WITH SEAL BETWEEN ENDWALL AND AIRFOIL SECTION

(71) Applicant: United Technologies Corporation, Farmington, CT (US)

(72) Inventor: Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 364 days.

(21) Appl. No.: 15/354,070

(22) Filed: Nov. 17, 2016

(65) Prior Publication Data

US 2018/0135450 A1 May 17, 2018

(51) Int. Cl.
| | | |
|---|---|---|
| *F01D 11/00* | (2006.01) | |
| *F02C 3/04* | (2006.01) | |
| *F01D 5/14* | (2006.01) | |
| *F01D 9/02* | (2006.01) | |
| *F04D 29/32* | (2006.01) | |
| *F04D 29/54* | (2006.01) | |
| *F04D 29/08* | (2006.01) | |

(Continued)

(52) U.S. Cl.
CPC ............ *F01D 11/003* (2013.01); *F01D 5/147* (2013.01); *F01D 5/187* (2013.01); *F01D 5/284* (2013.01); *F01D 5/3084* (2013.01); *F01D 9/02* (2013.01); *F01D 9/041* (2013.01); *F02C 3/04* (2013.01); *F04D 29/083* (2013.01); *F04D 29/324* (2013.01); *F04D 29/542* (2013.01); *F05D 2220/32* (2013.01); *F05D 2230/60* (2013.01); *F05D 2230/90* (2013.01); *F05D 2240/35* (2013.01); *F05D 2240/57* (2013.01); *F05D 2250/20* (2013.01); *F05D 2300/10* (2013.01); *F05D 2300/20* (2013.01); *Y02T 50/672* (2013.01); *Y02T 50/673* (2013.01); *Y02T 50/676* (2013.01)

(58) Field of Classification Search
CPC ........ F01D 11/003; F01D 5/187; F01D 5/188; F01D 5/189; F01D 5/147; F01D 9/02
See application file for complete search history.

(56) References Cited

U.S. PATENT DOCUMENTS

| | | |
|---|---|---|
| 3,215,511 A | 11/1965 | Chisholm |
| 4,137,008 A | 1/1979 | Grant et al. |

(Continued)

FOREIGN PATENT DOCUMENTS

| | | |
|---|---|---|
| EP | 0764764 | 3/1997 |
| EP | 1239119 | 9/2002 |

(Continued)

OTHER PUBLICATIONS

European Search Report for European Patent Application No. 17202407.7 completed Mar. 16, 2018.

(Continued)

*Primary Examiner* — Dwayne J White
*Assistant Examiner* — Jackson N Gillenwaters
(74) *Attorney, Agent, or Firm* — Carlson, Gaskey & Olds, P.C.

(57) ABSTRACT

An airfoil includes an endwall section and an airfoil section that defines, at least in part, an airfoil profile. At least one of the airfoil section or the endwall section includes a seal cavity, and a seal is disposed in the seal cavity.

11 Claims, 4 Drawing Sheets

(51) Int. Cl.
*F01D 5/18* (2006.01)
*F01D 5/28* (2006.01)
*F01D 5/30* (2006.01)
*F01D 9/04* (2006.01)

(56) References Cited

U.S. PATENT DOCUMENTS

| | | | |
|---|---|---|---|
| 4,247,259 A | 1/1981 | Saboe et al. | |
| 4,396,349 A | 8/1983 | Hueber | |
| 4,786,234 A | 11/1988 | Readnour | |
| 4,856,962 A | 8/1989 | McDow | |
| 4,914,794 A | 4/1990 | Strangman | |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,556,578 B1 * | 10/2013 | Memmen | F01D 5/189 277/644 |
| 8,821,124 B2 | 9/2014 | Viens et al. | |
| 9,410,437 B2 * | 8/2016 | Paige | F01D 5/28 |
| 9,611,755 B2 * | 4/2017 | Memmen | F01D 25/12 |
| 2006/0228211 A1 | 10/2006 | Vance et al. | |
| 2008/0159850 A1 | 7/2008 | Tholen et al. | |
| 2010/0068034 A1 | 3/2010 | Schiavo et al. | |
| 2010/0136258 A1 | 6/2010 | Strock et al. | |
| 2013/0343878 A1 | 12/2013 | Propheter-Hinckley | |
| 2016/0090851 A1 | 3/2016 | Carr et al. | |
| 2016/0102577 A1 * | 4/2016 | Grant | F01D 9/042 415/1 |

FOREIGN PATENT DOCUMENTS

| | | |
|---|---|---|
| EP | 1764481 | 3/2007 |
| EP | 2105579 | 9/2009 |
| EP | 2636846 | 9/2013 |
| EP | 2853688 | 4/2015 |
| EP | 3091187 | 11/2016 |
| EP | 3159484 | 4/2017 |
| GB | 2272453 | 5/1994 |
| GB | 2378733 | 2/2003 |
| JP | 61066802 | 4/1986 |
| JP | 05321602 | 12/1993 |
| JP | 2007255224 | 10/2007 |
| WO | 2013189883 | 12/2013 |
| WO | 2015075233 | 5/2015 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

* cited by examiner

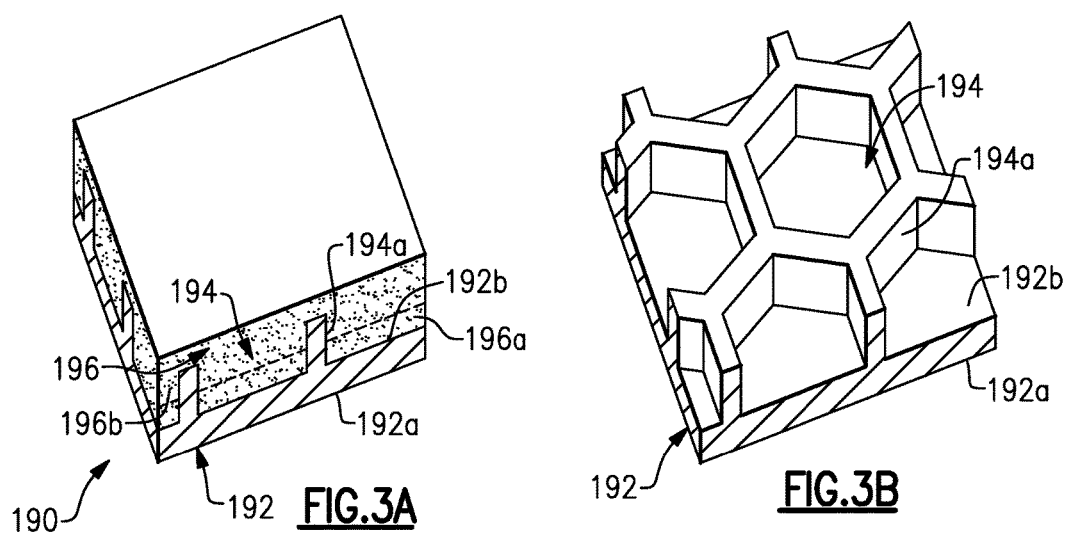

US 10,458,262 B2

AIRFOIL WITH SEAL BETWEEN ENDWALL AND AIRFOIL SECTION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an endwall section, and an airfoil section that defines, at least in part, an airfoil profile. One of the airfoil section or the endwall section includes a seal cavity. A seal is disposed in the seal cavity.

In a further embodiment of any of the foregoing embodiments, the endwall section has a first slot. The airfoil section includes a second slot, and the first slot and the second slot together form the seal cavity.

In a further embodiment of any of the foregoing embodiments, the airfoil section includes a rib, and the second slot is in the rib.

In a further embodiment of any of the foregoing embodiments, the airfoil section includes an internal passage, and the rib sub-divides the internal passage.

In a further embodiment of any of the foregoing embodiments, the rib is radially elongated.

In a further embodiment of any of the foregoing embodiments, the rib has enlarged radial ends.

In a further embodiment of any of the foregoing embodiments, the first slot and the second slot are radial slots.

In a further embodiment of any of the foregoing embodiments, the seal is a feather seal.

In a further embodiment of any of the foregoing embodiments, the airfoil section is formed of ceramic and the seal is formed of metal.

In a further embodiment of any of the foregoing embodiments, the airfoil section includes a rib. The second slot is in the rib. The airfoil section includes an internal passage. The rib sub-divides the internal passage. The rib is radially elongated, and the seal is a feather seal.

In a further embodiment of any of the foregoing embodiments, the seal is rigidly attached with the other one of the airfoil section or the endwall section.

A gas turbine engine according to an example of the present disclosure includes a compressor section, a combustor in fluid communication with the compressor section, and a turbine section in fluid communication with the combustor. One of the turbine section or the compressor section includes an airfoil that has an endwall section. An airfoil section defines, at least in part, an airfoil profile. One of the airfoil section or the endwall section includes a seal cavity. A seal is disposed in the seal cavity.

In a further embodiment of any of the foregoing embodiments, the endwall section has a first slot. The airfoil section includes a second slot, and the first slot and the second slot together form the seal cavity.

In a further embodiment of any of the foregoing embodiments, the airfoil section includes a rib, the second slot is in the rib, the airfoil section includes an internal passage, and the rib sub-divides the internal passage.

In a further embodiment of any of the foregoing embodiments, the first slot and the second slot are radial slots.

In a further embodiment of any of the foregoing embodiments, the seal is a feather seal.

In a further embodiment of any of the foregoing embodiments, the airfoil section is formed of ceramic and the seal is formed of metal.

In a further embodiment of any of the foregoing embodiments, the seal is rigidly attached with the other one of the airfoil section or the endwall section.

A method according to an example of the present disclosure includes placing a seal into a seal cavity in at least one of an endwall section or an airfoil section by bringing the endwall section and the airfoil section together such that the seal enters into the seal cavity. The airfoil section defines, at least in part, an airfoil profile, In a further embodiment of any of the foregoing embodiments, the endwall section has a first slot, the airfoil section includes a second slot, the first slot and the second slot together form the seal cavity, the airfoil section includes a rib, the second slot is in the rib, the airfoil section includes an internal passage, the rib sub-divides the internal passage, the rib is radially elongated, and the seal is a feather seal.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3A illustrates a sectioned view of a geometrically segmented coating section.

FIG. 3B illustrates a wall of the geometrically segmented coating section of FIG. 3A, without the coating.

DETAILED DESCRIPTION

Figure 1:
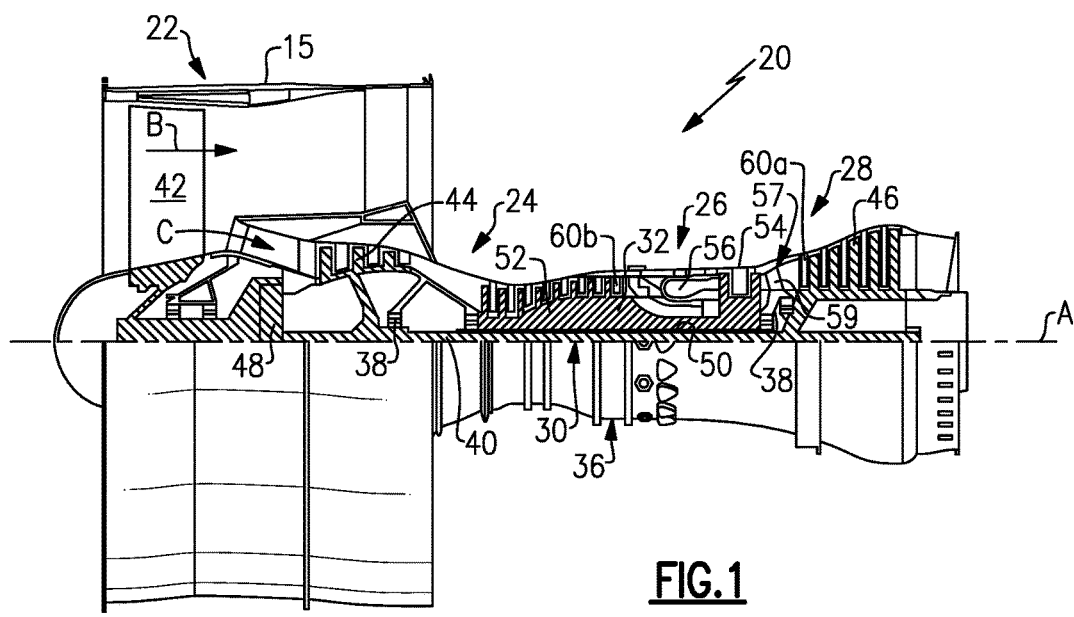
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
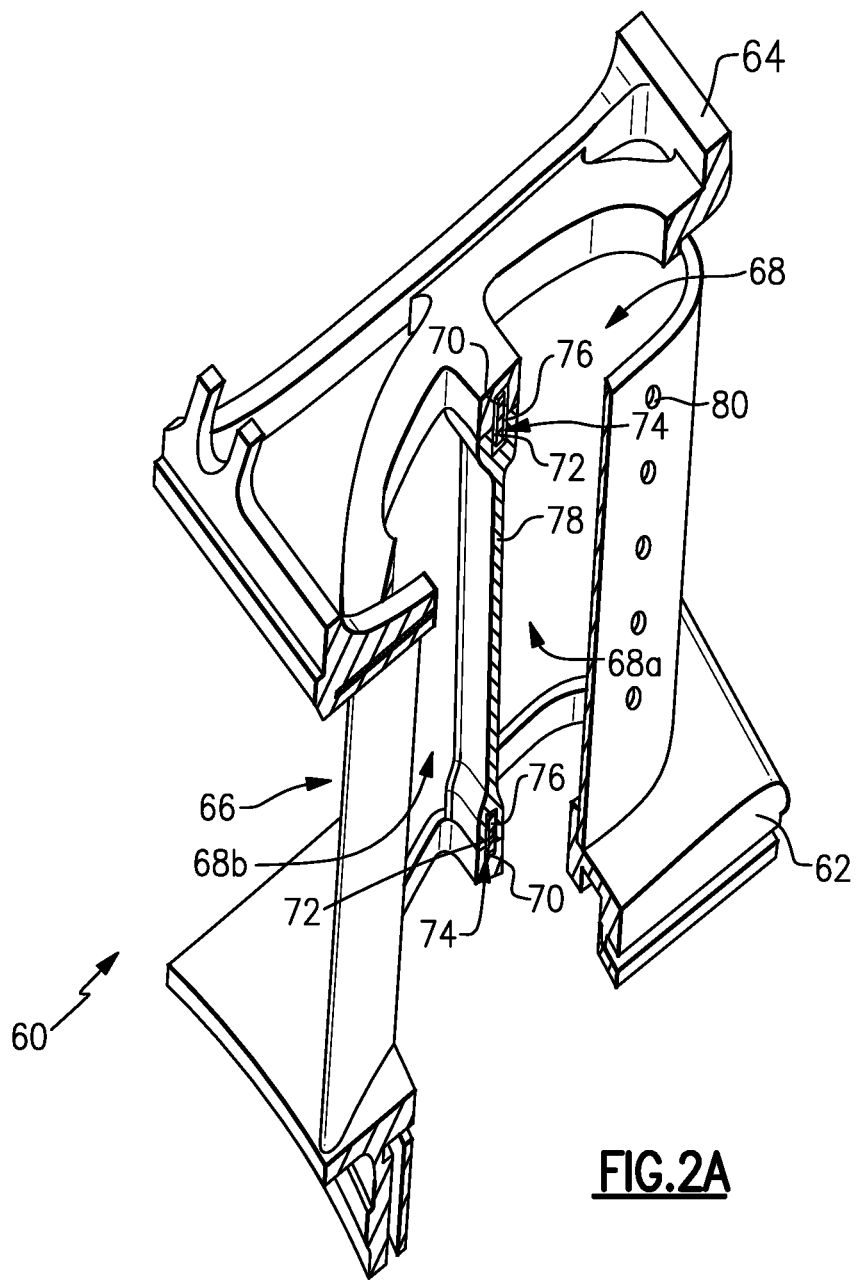
FIG. 2A illustrates a partially cut away view of an airfoil.
Figure 2B:
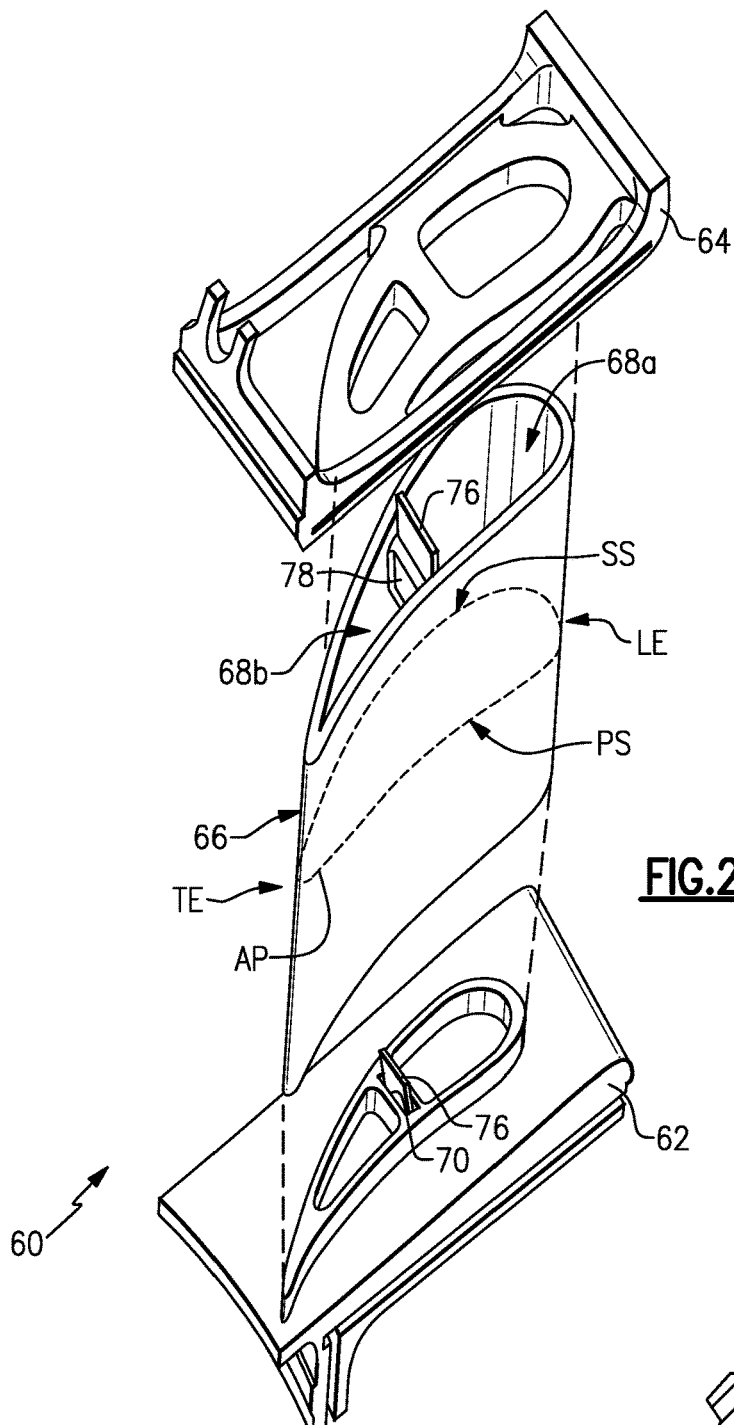
FIG. 2B illustrates an exploded view of the airfoil of FIG. 2A.

FIG. 2A illustrates a partially cut away view of an example airfoil 60 used in the engine 20, and FIG. 2B illustrates an exploded view of the airfoil 60. For instance, the airfoil 60 can be a turbine vane, as represented at 60a in FIG. 1, or a compressor vane, as represented at 60b in FIG. 1. As will be appreciated, although the examples herein may be described in the context of a vane, this disclosure is not limited to vanes, and the examples may also be applicable to blades or other airfoils that are exposed to high temperatures.

The airfoil 60 includes inner and outer endwall sections 62/64 and an airfoil section 66 that extends radially between the inner and outer endwall sections 62/64. In this example, the endwall sections 62/64 are platforms that together provide the inner and outer bounds of the core gas path. Alternatively, for a variable vane, the sections 62/64 may have aerodynamic geometries without platforms; or for a blade, the airfoil 60 may include only an inner end section. The airfoil section 66 may be hollow and can include one or more internal passages 68. A passage can include a cavity, a channel, or the like.

The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile AP generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

In the illustrated example, the airfoil section 66 is a separate distinct piece from both of the endwall sections 62/64. For example, the endwall sections 62/64 trap the airfoil section 66 there between. However, it is to be understood that the airfoil section 66 could alternatively be attached to or integral with one of the endwall sections 62/64 and the other of the endwall sections 62/64 may be disposed on the free radial end of the airfoil section 66.

In the illustrated example, the endwall sections 62/64 each include respective first slots 70, and the airfoil section 66 includes second slots 72. In this example, the second slots 72 are disposed at the inner and outer radial ends, respectively, of the airfoil section 66. If the airfoil section 66 were instead attached to or integral with either of the endwall sections 62/64 rather than a separate distinct piece, the airfoil section 66 would have one or more second slots 72 at the free radial end. The slots 70/72 may be formed using techniques such as, but not limited to, electro-discharge machining (EDM), casting, laser cutting, or preform formation during lay-up (for ceramic matrix composite material). In the lay-up technique, fiber plies may be arranged around a carbon or other sacrificial piece that has the geometry of the desired slot. Upon thermal processing, the carbon or other sacrificial piece vaporizes, leaving the slot in its place.

When the airfoil section 66 is brought together with the endwall sections 62/64, each of the first slots 70 aligns with one of the second slots 72 to form a seal cavity 74. A seal 76 is disposed in the seal cavity 74. Thus, for every pair of first and second slots 70/72 there is one seal cavity 74 and one seal 76 in the one seal cavity 74.

In the example shown, the seal 76 is a feather seal. The feather seal is relatively flat and of substantially uniform thickness. For example, the feather seal has an aspect ratio of greater than about two. In further examples, the feather seal may have a thickness of approximately 10 mils to 35 mils (254 micrometers to 890 micrometers). The geometry of the seal cavity 74 generally replicates the geometry of the feather seal, but the seal cavity 74 may be slightly larger than the feather seal to facilitate assembly. In one example, the feather seal has an interference fit with the seal cavity 74. In further examples, the sum of the manufacturing tolerance of the seal cavity 74 in the radial direction and the manufacturing tolerance of the feather seal in the radial direction may be no more than approximately 30 mils to 60 mils (762 micrometers to 1524 micrometers). There may be a pressure differential across the feather seal. The pressure differential urges the feather seal against the lateral sides of the seal cavity 74, in essence conforming the feather seal to the lateral sides. The conformance, in turn, blocks gas from passing by the feather seal and into the airfoil 60.

In the illustrated example, the slots 70/72 are radially elongated (with respect to the engine central axis), and the seal 76 is thus radially oriented. The slot or slots 72 in the airfoil section 66 are in a rib 78 of the airfoil section 66. For instance, the rib 78 is elongated and sub-divides the internal passage 68 into sub-passages 68a/68b. The rib 78 may have a substantially uniform thickness or the rib 78 may be enlarged at the radial ends to accommodate the presence of the slots 72. The seal or seals 76 seal the sub-passages 68a/68b from each other. For example, cooling bleed air may be provided to each of the sub-passages 68a/68b; however, the cooling bleed air may be provided from different stages of the compressor section 24 and thus may be at different pressures. Use of higher pressure air from the compressor section 24 (e.g., in the sub-passage 68a) comes at a greater efficiency penalty. Sealing the sub-passages 68a/68b from each other limits or prevents mixing of the cooling bleed air between the sub-passages 68a/68b. In turn, this reduces loss of the higher pressure cooling bleed air (e.g., from the sub-passage 68a to the sub-passage 68b) and the potential for a "short circuit" of cooling bleed air to intended locations, such as to cooling holes 80 in the sub-passage 68a or elsewhere.

Figure 2C:
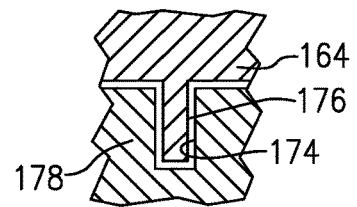
FIG. 2C illustrates another example with a seal cavity and an integrated seal.

FIG. 2C illustrates a modified example in which the seal 176 is, in essence, integrated into one or the other of the endwall section or the airfoil section. In this disclosure, like reference numerals designate like elements where appropriate and reference numerals with the addition of one-hundred or multiples thereof designate modified elements that are understood to incorporate the same features and benefits of the corresponding elements. In this example, the rib 178 includes the seal cavity 174. Rather, than a slot, the endwall section 164 (or alternatively, the endwall section 62) includes the seal 176, which is rigidly attached thereto. The seal 176 projects into the seal cavity 174. Unlike the feather seal though, the rigidity of the seal 176 may limit the ability of the seal 176 to conform to the sides of the seal cavity 174. The seal 176 may thus function as a shiplap seal. As will be appreciated, the seal 176 could alternatively be on the rib 178 and the seal cavity 174 on the endwall section 164.

The airfoil section 66 may be formed of a ceramic to enhance thermal resistance. The ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

In another example, the airfoil section 66 may include or may be formed of a geometric segmented coating section 190, a representative portion of which is shown in FIG. 3A. The coating section 190 includes a wall 192. The wall 192 includes a first or inner side 192*a* and a second or exterior side 192*b* that is opposite the first side 192*a*. The second side 192*b* includes an array of cells 194 defined by cell sidewalls 194*a*. The array is a repeating geometric pattern of one or more cell geometries. In this example, the cell sidewalls 194*a* have a uniform thickness. As shown in the isolated view of the wall 192 in FIG. 3B, the cells 194 are hexagonal. Alternatively, the cells 194 may be circular, ovular, other polygonal geometry, or mixed cell geometries. The cells may have been machined or cast directly into the wall 192, or machined into a metallic bond coating applied to the wall exterior side 192*b*. In the case where the cells 194 are machined or cast directly into the substrate of the wall 192, a metallic bond coating may be applied.

A ceramic based thermal barrier coating 196 is disposed in the array of cells 194. The cells 194 mechanically segment the coating 196. This segmentation induces stress relief cracks in the coating 196 making it tolerant to sintering. The cells 194 thus provide good spallation resistance of the coating 196, particularly at higher temperature locations. In turn, greater spallation resistance may reduce the need for bleed air for cooling or enable use of higher temperature bleed air that is less of an efficiency penalty.

The coating 196 may be a barrier coating, such as a thermal barrier or environmental barrier, which is formed of a ceramic. The coating 196 may be a monolayer coating but more typically will be a multi-layer coating. For instance, the coating 196 has a first coating layer 196*a* and a second coating layer 196*b*. In this example, the second coating layer 196*b* is a topcoat.

The ceramic material of the coating 196 provides thermal and/or environmental resistance. As an example, the ceramic material may include or may be yttria stabilized with zirconia, hafnia, and/or gadolinia, gadolinia zirconate, molybdate, alumina, or combinations thereof.

The coating section 190 may be formed using several different fabrication techniques. As an example, the wall 192 may be fabricated by investment casting, additive manufacturing, brazing, or combinations thereof, but is not limited to such techniques. For instance, the cells 194 can be separately fabricated and brazed to the remaining portion of the wall 192, which can be investment cast or additively fabricated. Alternatively, the cells 194 can be formed by other techniques, such as depositing an alloy bond coating and removing sections of the alloy coating by machining, electro-discharge machining (EDM), or other removal process. In another scenario the cells 194 can be machined into the wall 192.

To produce the coating 196, ceramic coating material is deposited into the cells 194. The deposition process can include, but is not limited to, plasma spray or physical vapor deposition. In one example, plasma spray is used to produce a more durable version of the coating 196. For instance, the coating 196 has a laminar microstructure. The laminar microstructure includes grains of ceramic material that have a high aspect ratio. The laminar microstructure is a product of the plasma spray process, in which droplets of melted or partially melted ceramic material are sprayed onto the cells 194. Upon impact, the droplets flatten and solidify, yielding the laminar microstructure. There may be voids or pores among the grains; however, the coating 196 is substantially fully dense. For instance, the coating 196 has a porosity of less than 10%.

The ceramic coating material fills or substantially fills the cells 194 and is deposited in a thickness that may be equal to or greater than the height of the cell sidewalls 194*a*. At this stage, the surface of the coating may have contours from the underlying cells 194. If such contours are undesired, the surface may be machined, ground, or abraded flat. For instance, the surface is reduced down to or close to the tops of the cell sidewalls 194*a*.

The seal 76 may be formed of metal. Example metals may include, but are not limited to, nickel alloys, cobalt alloys, a nickel alloy coated with cobalt or cobalt alloy, or non-nickel alloys that do not substantially react with ceramic.

FIG. 2B also illustrates a method of assembling the airfoil 60. For example, the method includes placing the seal 76 into either the first slot 70 in one of the endwall sections 62/64 or the second slot 72 in the airfoil section 66. The endwall section 62 and/or 64 and the airfoil section 66 are then brought together such that the first slot 70 and the second slot 72 form the seal cavity 74 with the seal 76 in the seal cavity 74. For the seal 176, the seal 176 is placed into the seal cavity 174 by bringing the endwall section 164 and the airfoil section (i.e., the rib 178) together such that the seal 176 is enters into the seal cavity 174. The method may be performed in connection with the assembly of a new airfoil or in connection with re-assembling an existing airfoil that was disassembled for repair, refurbishment, etc.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an endwall section;
    an airfoil section defining, at least in part, an airfoil profile, at least one of the airfoil section or the endwall section including a seal cavity,
    the endwall section including a first slot, the airfoil section including a second slot, and the first slot and the second slot together from the seal cavity,
    the airfoil section including a rib that is radially elongated and has enlarged radial ends, and the second slot is in the rib,
    the airfoil section including an internal passage and the rib sub-divides the internal passage; and
    a seal disposed in the seal cavity.

2. The airfoil as recited in claim 1, wherein the first slot and the second slot are radial slots.

3. The airfoil as recited in claim 1, wherein the seal is a feather seal.

4. The airfoil as recited in claim 1, wherein the airfoil section is formed of ceramic and the seal is formed of metal.

5. The airfoil as recited in claim 1, wherein the seal is a feather seal.

6. A gas turbine engine comprising:
    a compressor section;
    a combustor in fluid communication with the compressor section; and
    a turbine section in fluid communication with the combustor, at least one of the turbine section or the compressor section including an airfoil having
first and second endwall sections, at least the first endwall section including a first slot,
an airfoil section trapped radially between the first and second endwall sections and defining, at least in part, an airfoil profile, the airfoil section including an internal passage and a rib that sub-divides the internal passage, the rib including a second slot, the first slot and the second slot together forming a seal cavity, and
a seal disposed in the seal cavity.

7. The gas turbine engine as recited in claim 6, wherein the first slot and the second slot are radial slots.

8. The gas turbine engine as recited in claim 6, wherein the seal is a feather seal.

9. The gas turbine engine as recited in claim 6, wherein the airfoil section is formed of ceramic and the seal is formed of metal.

10. A method comprising:
placing a seal into a seal cavity in at least one of an endwall section or an airfoil section, wherein the airfoil section defines, at least in part, an airfoil profile, by bringing the endwall section and the airfoil section together such that the seal enters into the seal cavity,
the endwall section including a first slot, the airfoil section including a second slot, and the first slot and the second slot together from the seal cavity,
the airfoil section including a rib that is radially elongated and has enlarged radial ends, and the second slot is in the rib,
the airfoil section including an internal passage and the rib sub-divides the internal passage.

11. The method as recited in claim 10, wherein the seal is a feather seal.

* * * * *